UNITED STATES PATENT OFFICE.

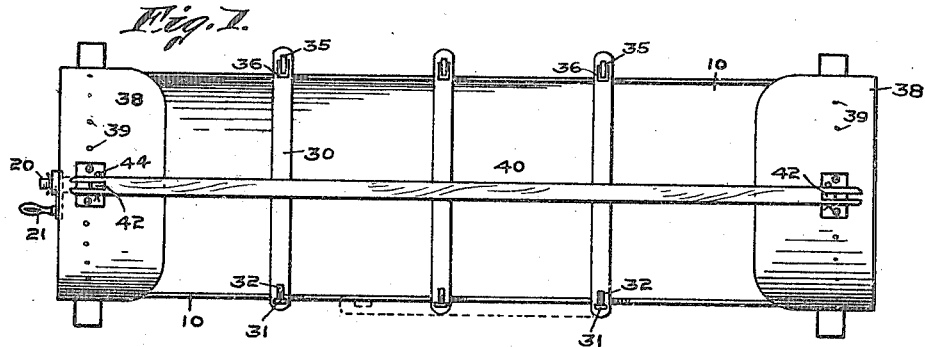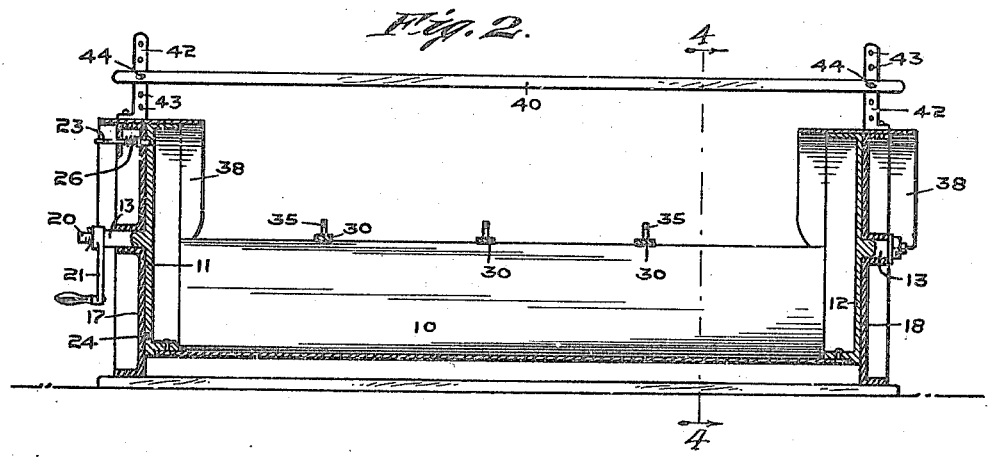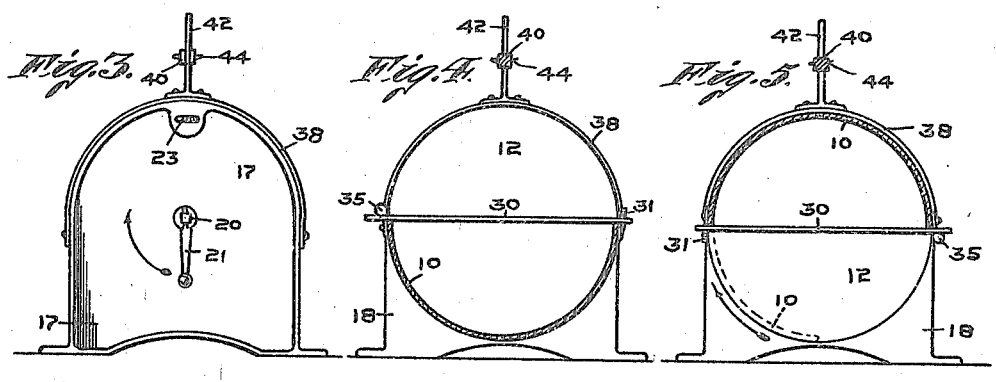

JOHN HERBERT, OF POLAND, INDIANA, ASSIGNOR OF ONE-HALF TO GUY KENNEDY, OF POLAND, INDIANA.

COMBINED WATERING AND FEEDING TROUGH.

1,257,861.  Specification of Letters Patent.  Patented Feb. 26, 1918.

Application filed June 8, 1916. Serial No. 102,549.

*To all whom it may concern:*

Be it known that I, JOHN HERBERT, a citizen of the United States, residing at Poland, in the county of Clay and State of Indiana, have invented certain new and useful Improvements in Combined Watering and Feeding Troughs, of which the following is a specification.

This invention relates to a combined watering and feed trough, for watering and feeding live stock; and the object of the invention consists in the provision of a trough of the above character which can be moved from normal to an inverted position, at the will of the operator, in order to discharge the contents of the trough, thereby permitting the latter to be easily cleaned and enabling the trough to be kept in a good sanitary condition.

A further object of the invention consists in the provision of a trough of the above character which will permit such water as remains after watering live stock and which is subject to freezing during cold weather in stationary troughs, to be easily discharged, this being an advantage both from a sanitary and economical standpoint. The trough may also be sustained in an inverted position when not in use so as to exclude snow from which an accumulation of water within the trough would result.

A further object of the invention consists in the provision of a trough of the above character whereby small stock, such as hogs, are prevented from promiscuous jumping back and forth across the trough by which means considerable dirt is carried into the trough. The trough is further provided with means for preventing pigs from jumping into and wading lengthwise therein through the feed-material, as these animals are prone to do.

There are other objects which will appear during a perusal of the following description and claim.

I accomplish the objects of the invention by means of the construction illustrated in the accompanying drawing, forming a part hereof, in which—

Figure 1 is a top or plan view of my improved watering and feeding trough. Fig. 2 is a central vertical sectional view through the trough. Fig. 3 is an end elevation of the construction shown in Fig. 1. Fig. 4 is a transverse section on the line 4—4 in Fig. 2, showing the trough occupying normal operative position. Fig. 5 is a view similar to Fig. 4, except that the trough is shown as occupying an inverted position.

Referring to the drawings, 10 represents a sheet metal trough forming the receptacle for holding the water and feed. This trough is preferably formed semi-circular in cross section so as to obviate corners, rendering same to be kept more easily in a sanitary condition, but troughs which in cross section are other than semi-circular can be employed if desired. The trough 10 is secured at each end to circular disks 11 and 12, and these disks are each provided with a centrally located outwardly disposed trunnion 13 resting within suitable bearings formed in supporting end-frames 17 and 18. One of the trunnions 13 is squared on its outer end as at 20 and receives a hand-crank 21 by which the trough can be moved from normal to an inverted position where it may be positively held by means of a latch-pin 23 engaging one of a plurality of apertures 24 in the adjacent surface of disk 11. These apertures 24 are arranged concentrically around the axis of disk 11 and are spaced about ninety degrees apart. With this arrangement of apertures 24 the trough 10 may be moved ninety degrees to bring same in a position as indicated by means of the dotted lines in Fig. 5. With the trough resting in this position the same may be easily flushed and scrubbed, and all water used in cleaning is readily drained out of the trough. The outer end of latch-pin 23 may be provided with an eye or a ball to enable a better purchase to be had for operating said bar, and the latter is normally held against the surface of the disk 11 by means of a spring 26.

Arranged transversely of the trough at uniform spaced places are a number of bars 30 which are provided to prevent small stock, such as pigs, from wading lengthwise of the trough through the feed. The bars 30 are easily placed into and removed from operative position by suitable connections comprising a number of ears 31 which stand parallel with the side edge of trough 10 and to which they are secured. The bars 30 are provided with elongated slots 32, so that placing the bars into a position to bring slots 32 in line with ears 31, as shown by means of the dotted position in Fig. 1, the ears will readily pass through said slots, and then by moving the bars transversely of the trough brings the slots at right angles of the ears, this connection preventing separation of the parts. The opposite ends of bars 30 are secured to lugs 35 which stand transversely of the trough 10 to which they are attached. The bars 30 are further provided with longitudinal slots 36 through which lugs 35 pass, and these bars may be forced down over lugs 35 through the yieldability of the sides of the trough, this yieldability also operating in pulling the edge of slots 36 under the under-cut faces of lugs 35 and preventing accidental displacement of the ends of the bars.

To prevent foreign substance from gaining access to the meeting faces of disks 11 and 12, and end-frames 17 and 18, and interfering with the operation of the trough, the said parts are protected from the weather by means of the hoods 38, the latter being secured to the outer edges of the end-frames by the rivets 39.

When the trough is employed for watering cattle I provide means to prevent the animals from stepping over the trough, which they are prone to do, thereby reducing the liability of the trough being upset or permanently injured. The said means which forms a barrier consists of a pole 40 which extends longitudinally of the trough and is arranged somewhat above the hoods 38 in the standards 42 which are secured to and supported by the end-frames 17 and 18. The standards 42 are provided with a plurality of apertures 43 and by means of suitable pins 44 the elevation of pole 40 above the trough 10 may be varied.

While I have described my invention with more or less minuteness as regards details of construction and arrangement, and as being embodied in certain precise forms, I do not desire to be limited thereto unduly or any more than is pointed out in the claim. On the contrary, I contemplate all proper changes in form, construction and arrangement, the omission of immaterial elements, and the substitution of equivalents as circumstances may suggest or necessity render expedient.

I claim:

The combination, with a feeding trough having resilient sides, of a plurality of removable bars across the mouth of said trough, said bars being provided in one end with transverse slots and having longitudinal slots in the other ends, T-shaped ears arranged along one side of the trough for engaging said transverse slots, and lugs arranged along the opposite side of the trough for engaging the longitudinal slots in the bars, said lugs being set so that the outer edges extend slightly beyond the outer ends of the longitudinal slots and can be sprung into said slots through the resiliency of the sides of the trough.

In witness whereof, I have hereunto set my hand and seal at Indianapolis, Indiana, this 18th day of May, A. D. one thousand nine hundred and sixteen.

JOHN HERBERT. [L. S.]

Copies of this patent may be obtained for five cents each, by addressing the "Commissioner of Patents, Washington, D. C."